(12) United States Patent
Hasegawa et al.

(10) Patent No.: US 7,451,857 B2
(45) Date of Patent: Nov. 18, 2008

(54) SEAT MOUNT STRUCTURE FOR SADDLE RIDE TYPE VEHICLE

(75) Inventors: Yosuke Hasegawa, Saitama (JP); Makoto Toda, Saitama (JP); Yuji Maki, Saitama (JP); Masahiro Inoue, Saitama (JP); Hiroaki Tomita, Saitama (JP); Akio Handa, Saitama (JP); Atsuko Yamaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 11/217,345

(22) Filed: Sep. 2, 2005

(65) Prior Publication Data

US 2006/0049006 A1    Mar. 9, 2006

(30) Foreign Application Priority Data

Sep. 3, 2004  (JP) .............................. 2004-257284
Sep. 3, 2004  (JP) .............................. 2004-257350

(51) Int. Cl.
*B60T 1/06*    (2006.01)
*F16D 55/18*   (2006.01)
*F16D 55/00*   (2006.01)

(52) U.S. Cl. ..................... 188/18 A; 188/72.4; 188/73.1

(58) Field of Classification Search .................. 188/17, 188/18 A, 18 R, 72.1, 72.4, 73.1, 73.31, 73.39, 188/73.46

See application file for complete search history.

(56) References Cited

U.S. PATENT DOCUMENTS

| | | | |
|---|---|---|---|
| 4,473,139 A * | 9/1984 | Oka et al. ................... | 188/71.6 |
| 6,062,349 A * | 5/2000 | Boisseau et al. ......... | 188/73.45 |
| 6,257,378 B1 * | 7/2001 | Girkin et al. ............. | 188/73.31 |
| 6,408,991 B1 * | 6/2002 | Herffurth et al. ........... | 188/71.1 |

FOREIGN PATENT DOCUMENTS

| | | |
|---|---|---|
| JP | 1-21096 Y2 | 6/1989 |
| JP | 7-102796 B2 | 11/1995 |

* cited by examiner

*Primary Examiner*—Robert A. Siconolfi
*Assistant Examiner*—Thomas W Irvin
(74) *Attorney, Agent, or Firm*—Birch, Stewart, Kolasch & Birch, LLP

(57) ABSTRACT

A brake caliper support structure and a brake caliper structure for a saddle-ride type all terrain vehicle can attain a reduction in size and weight of a disc brake and can scrape off mud and snow accumulated within a wheel. A distance from a point which represents the center of a front wheel to each of points which represent the axes of bolts located at the same positions as the caliper support portions or the first and second mounting portions of the caliper bracket is set longer than the distance from the point to a point which represents the center of a piston. A brake hose is to be prevented from undergoing an excessively large deflection during steering or during vehicular vibration.

13 Claims, 13 Drawing Sheets

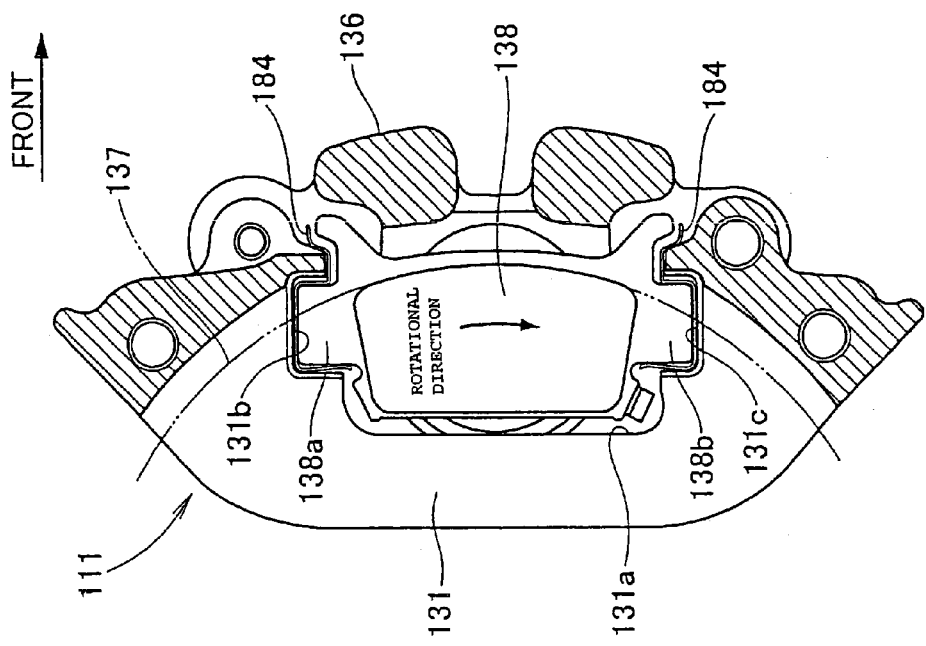
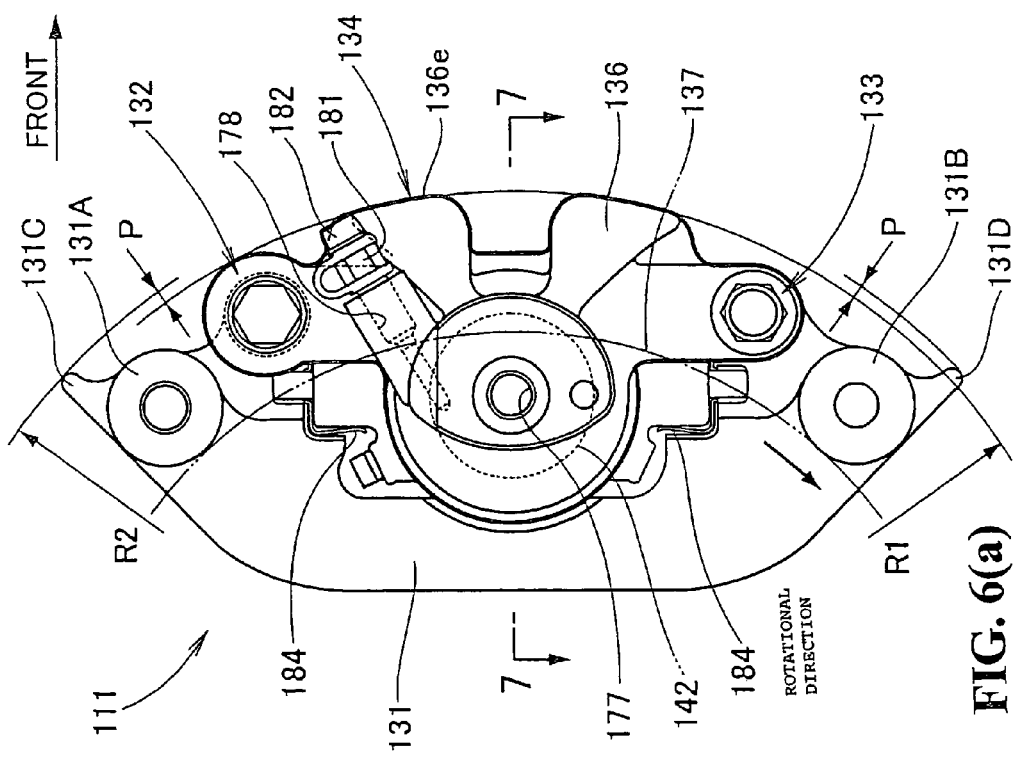
FIG. 6(a)
FIG. 6(b)

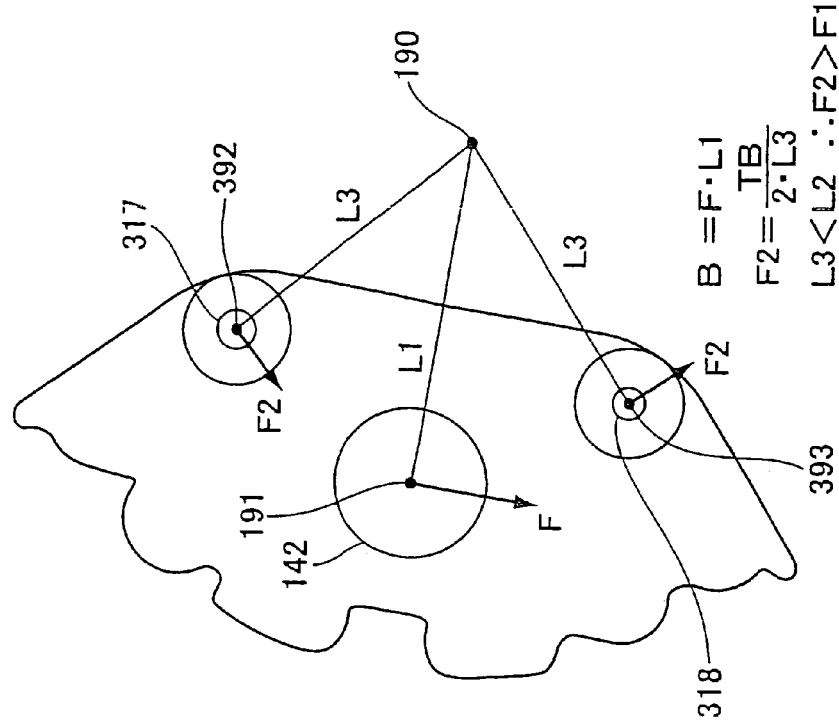
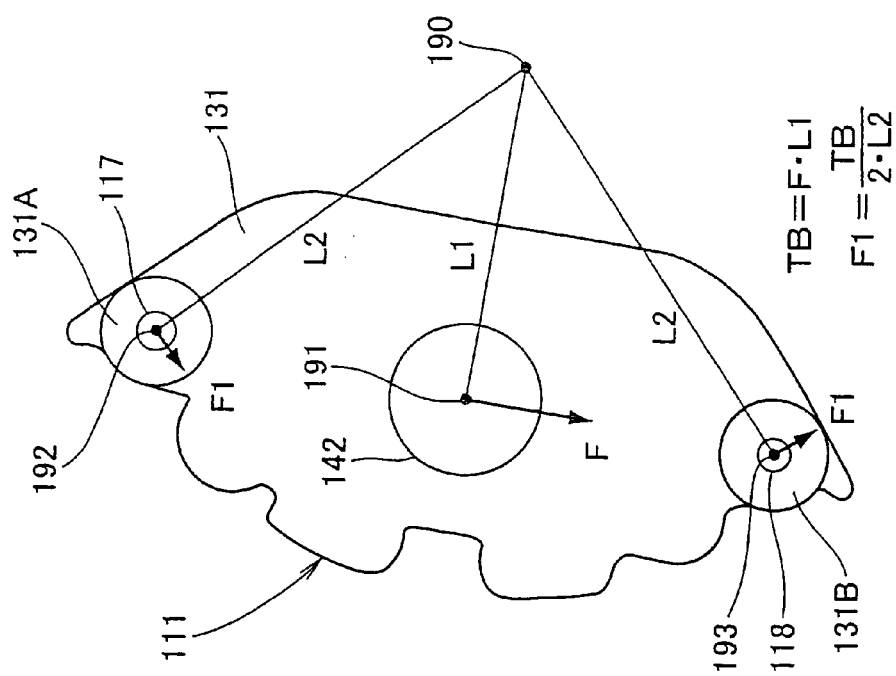

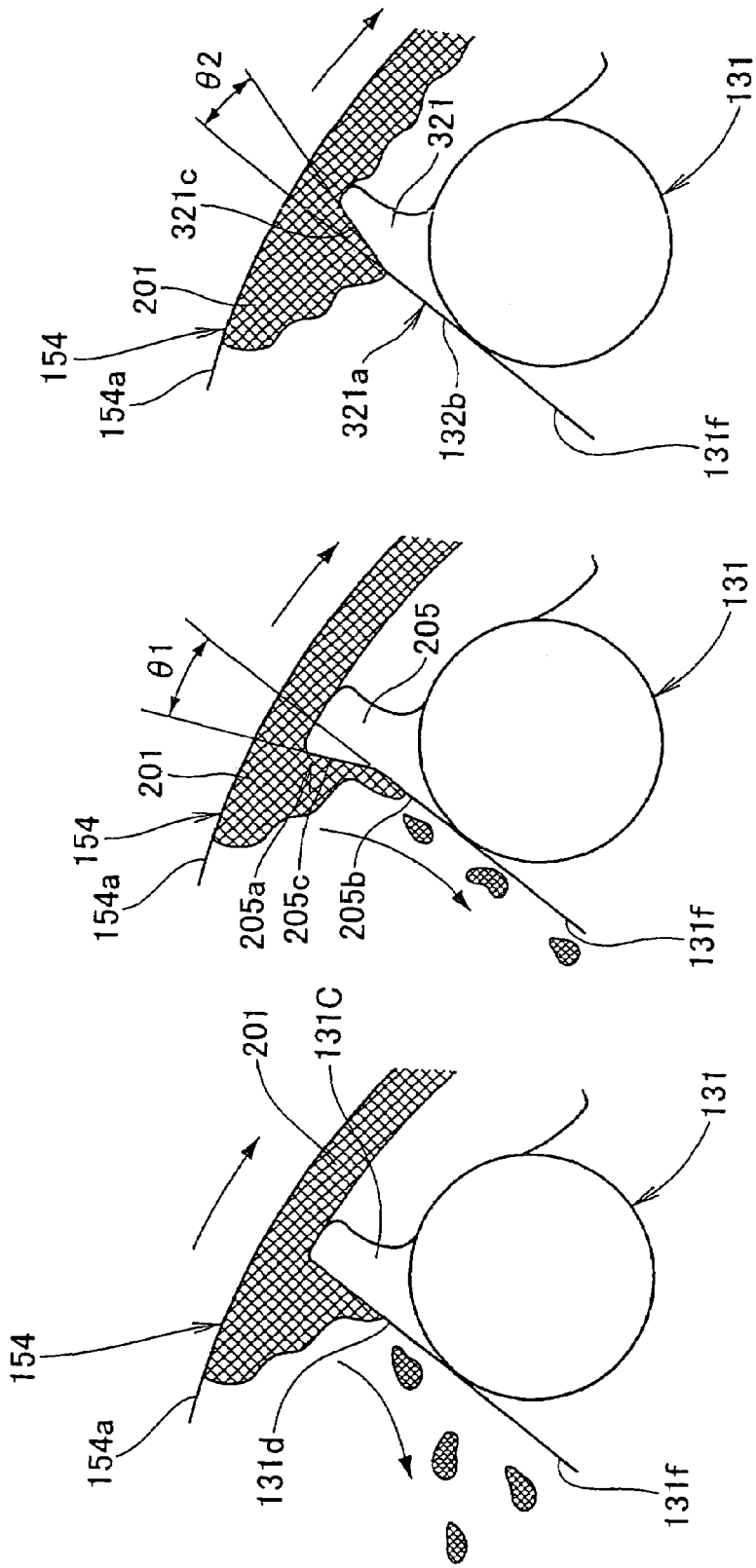

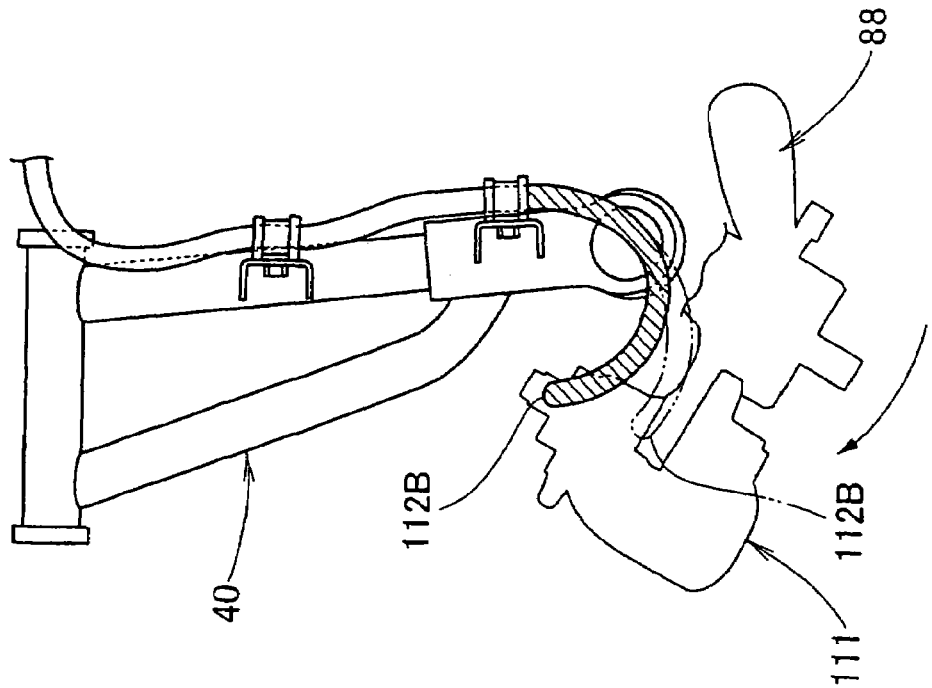
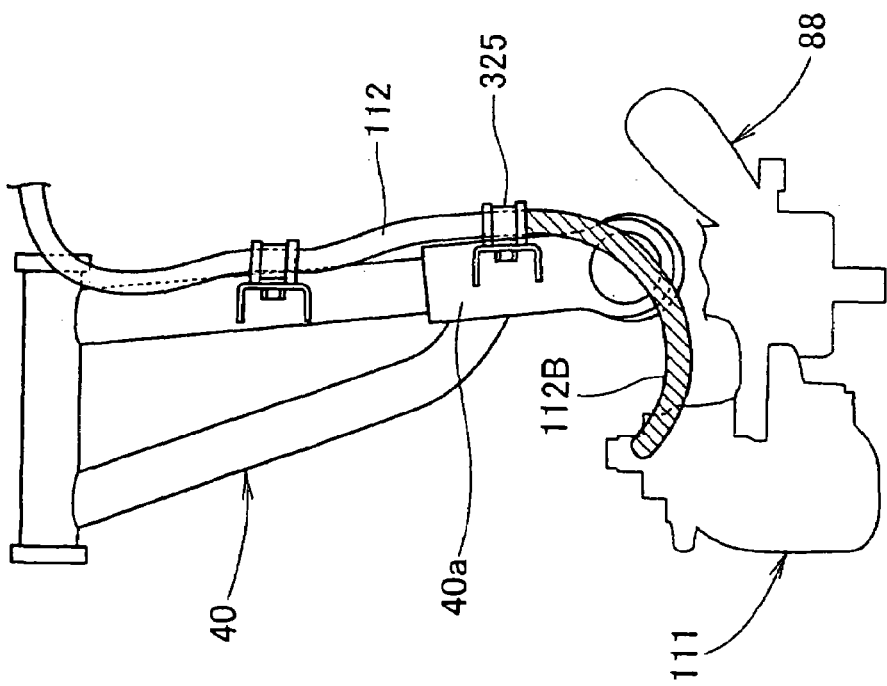
FIG. 13(a)
FIG. 13(b)

SEAT MOUNT STRUCTURE FOR SADDLE RIDE TYPE VEHICLE

CROSS-REFERENCE TO RELATED APPLICATIONS

This nonprovisional application claims priority under 35 U.S.C. § 119(a) on Patent Application Nos. 2004-257284 and 2004-257350, filed in Japan on Sep. 3, 2004. The entirety of each of the above-identified documents is incorporated herein by reference.

BACKGROUND OF THE INVENTION

1. Field of the Invention

The present invention relates to a seat mount structure for a saddle-ride type vehicle. In particular, the present invention relates to a brake caliper support structure and a brake caliper structure for a saddle-ride type all terrain vehicle. In addition, the present invention also relates to a brake hose support structure for a saddle-ride type all terrain vehicle.

2. Description of Background Art

A conventional brake caliper support structure and a conventional brake caliper structure are known, wherein a bracket is mounted to a knuckle and a brake caliper is mounted using the bracket through a pin (see, for example, Japanese Utility Model Publication No. Hei 1-21096). Japanese Utility Model Publication No. Hei 1-21096 will be described below, wherein reference numerals referred to in the same publication will be used.

As shown in FIGS. 1 to 3 of Japanese Utility Model Publication No. Hei 1-21096, a brake unit U is disposed inside a wheel rim 1 of a front wheel W. In the brake unit U, a bracket B is secured with a pair of bolts 3, 3 to a pair of support arm portions 2a, 2a of a knuckle 2 and a brake caliper C is slidably supported with a pair of caliper pins 10, 10 which are mounted with a pair of bolts 11, 11 to a pair of arm portions 4, 4 of the bracket B.

The brake caliper C movably supports in its inside a pair of first friction pads 61 and second friction pads 62, and incorporates a piston 8 therein. By exerting a brake fluid pressure on the piston 8 to move the first and second friction pads 61, 62, a brake disc D is sandwiched between the first and second friction pads 61, 62.

The portions where the brake unit U is supported by the knuckle 2, i.e., the pair of bolts 3, 3 are positioned radially inside with respect to the center of the piston 8. Therefore, for example, when the brake disc D is operated by the brake caliper C, a larger torque than the braking torque exerted on the piston 8 acts on the bolts 3, 3. Therefore, the bolts 3, 3 are required to have a high strength.

If the outside diameter of each bolt 3 is enlarged for enhancing the strength, the knuckle 2 and the bracket B become larger in size, with a consequent increase of weight.

A conventional brake hose support structure for a saddle-ride type all terrain vehicle is known, wherein a brake hose is fixed at an intermediate position thereof to a suspension arm (see, for example, Japanese Patent Publication No. Hei 7-102796). Japanese Patent Publication No. Hei 7-102796 will be described below, wherein reference numerals referred in the same publication will be used.

In Japanese Patent Publication No. Hei 7-102796, as shown in FIG. 3 thereof, it is disclosed that an upper arm 23 and a lower arm 24 are attached to a body frame 1 vertically swingably, a knuckle bracket 25 is attached through a ball joint 26 to a front end of each of the upper and lower arms 23, 24 to support a front vehicular wheel 11 rotatably, a caliper unit 32 is attached to the knuckle bracket 25, a brake hose 33 is secured at an intermediate position thereof to the upper arm 23 with use of a damper 23a, and a front end of the brake hose 33 is connected to the caliper unit 32.

In the technique of Japanese Patent Publication No. Hei 7-102796, the portion between the damper 23a and the caliper unit 32 is relatively long. Therefore, consideration is needed to prevent an excessively large deflection of the brake hose 33 when the said portion of the brake hose 33 bends and moves upon steering of the front wheel 11 or when the vehicle vibrates.

SUMMARY OF THE INVENTION

In the case where the vehicle equipped with the rim wheel 1 is an all terrain vehicle adapted to run on uneven roads, mud and snow are accumulated within the rim wheel 1 in many cases. Therefore, a demand exists for a structure that is able to remove mud and snow easily and in a simple manner.

It is an object of the present invention to provide a brake caliper support structure and a brake caliper structure for a saddle-ride type all terrain vehicle which can attain a reduction in the size and weight of a disc brake and also can easily remove mud and snow accumulated within a wheel.

According to a first aspect of the present invention, in a brake caliper support structure for a saddle-ride type all terrain vehicle wherein a hub is mounted rotatably to a knuckle, a wheel and a brake disc are secured to the hub, and a disc brake having a brake caliper for braking the brake disc in a sandwiching relation to the brake disc is disposed inside the wheel, the brake caliper including a pair of pads for sandwiching the brake disc therebetween, a piston for pushing the pads, a caliper body which accommodates the piston movably, and a caliper bracket secured to a caliper support portion which is provided in a knuckle for supporting the caliper body movably, a distance from the center of the wheel to the caliper support portion is set longer than the distance from the center of the wheel to the center of the piston.

By disposing the caliper support portion radially outside with respect to the center of the piston, it is possible to diminish the force acting on the brake caliper mounting portion and hence possible to diminish the strength of the caliper support portion. Moreover, since the caliper support portion is located radially outside, mud and snow adhered to the inside of the wheel can be scraped off.

According to a second aspect of the present invention, the saddle-ride type all terrain vehicle is a four-wheel drive vehicle.

In a four-wheel drive vehicle, for example, a strong hill-climbing ability is exhibited by the driving force of the four wheels, but a strong braking force is required on a steep hill and a strong force is exerted on the brake caliper support portion when the brake is applied. In the present invention, by disposing the caliper support portion as above, it is possible to diminish the force acting on the caliper support portion.

According to a third aspect of the present invention, the brake disc is protected by a cover member.

Since a cover member for protecting the brake disc is provided, the brake disc can be protected from flying gravel, etc.

According to a fourth aspect of the present invention, the cover member has a flange portion formed on an edge thereof, except for a lower portion.

Since the flange portion is formed on the cover member, except the lower portion of the cover member, mud, flying gravel, etc. can be made more difficult to strike against the brake disc by the presence of the flange portion. Furthermore, at the lower portion of the cover member, mud, flying gravel, etc. having entered between the brake disc and the cover member can be discharged more easily.

According to a fifth aspect of the present invention, in a brake caliper support structure for a saddle-ride type all terrain vehicle wherein a disc brake including a brake disc and a brake caliper for braking the brake disc in a sandwiching relation to the brake disc is disposed inside a wheel and a hub is mounted rotatably to a knuckle, the brake disc being secured to the hub and the brake caliper being secured to the knuckle, the brake caliper includes a caliper bracket mounted to the knuckle and a caliper assembly connected to the caliper bracket, and the caliper bracket has a projection at a position adjacent to the portion where it is mounted to the knuckle.

With the projection, mud, snow, etc. adhered to the inner surface of the wheel can be scraped off and it is not necessary to provide any special member for removing such mud, snow, etc.

According to a sixth aspect of the present invention, the projection is formed outside a portion projecting most radially outside of a body of the brake caliper.

Since the projection is formed outside the portion projecting most radially outside of the brake caliper body, mud, snow, etc. adhered to the inner surface of the wheel can be scraped off positively by the projection.

According to a seventh aspect of the present invention, an edge of the projection extends substantially radially of the brake disc and lies on an extension line of an edge of the caliper bracket or projects from the edge of the caliper bracket.

If the projection edge is positioned inside the caliper bracket edge, mud, snow, etc. are difficult to be scraped off by the projection edge. But in the present invention, since the projection edge lies on an extension line of the caliper bracket edge or projects from the caliper bracket edge, mud, snow, etc. can be scraped off easily by the projection edge.

According to an eighth aspect of the present invention, the caliper bracket is mounted to the knuckle in at least two positions and at least two such projections as referred to above are formed so that their tips are at an equal distance from the center of the wheel.

Since the tips of at least two projections are equidistant from the center of the wheel, the caliper bracket can be used in common to both right and left disc brakes in the vehicle.

It is also an object of the present invention to provide a brake hose support structure for a saddle-ride type all terrain vehicle that can prevent a brake hose from undergoing an excessively large deflection upon steering or vehicular vibration.

According to a ninth aspect of the present invention, in a brake hose support structure for a saddle-ride type all terrain vehicle wherein a disc brake including a brake disc and a brake caliper which brakes the brake disc in a sandwiching relation to the brake disc is disposed inside a wheel of a vehicular wheel, with a braking fluid pressure being fed to the brake caliper through a brake hose, right and left vehicular wheels are each supported independent-suspensionwise by an upper arm and a lower arm, and a knuckle is connected through ball joints to front ends of the upper arm and the lower arm, a hose support portion for supporting the brake hose is provided on a king pin axis extending through the centers of the ball joints.

In the background art, a brake hose is fixed to both the suspension arm and caliper unit. Therefore the distance between the fixed portions is relatively long, with the result that upon steering or vehicular vibration there has been a fear of an excessively large deflection of the brake hose. On the other hand, in the present invention, the hose support portion is provided on the king pin axis. Therefore, the brake hose bends around the hose support portion and deflects at only a short distance from the hose support portion to the brake caliper, whereby the amount and range of movement of the brake hose can be made small.

According to a tenth aspect of the present invention, the brake hose is supported by the upper arm.

The lower arm serves as a guard member which covers the lower portion of the brake hose, whereby the brake hose can be protected from flying gravel, projections on a road surface, etc.

According to an eleventh aspect of the present invention, the upper arm includes a pair of a front arm and a rear arm and the brake hose is disposed along the rear arm.

The front arm in the upper arm serves as a guard member which covers a front portion of the brake hose, whereby the brake hose can be protected from flying gravel.

According to a twelfth aspect of the present invention, one end of a cushion unit for cushioning a shock transmitted from each of the vehicular wheels to a vehicle body side is secured to the vehicle body side and an opposite end thereof is secured to the upper arm.

By attaching a lower end of the cushion unit to the upper arm, the lower end of the cushion unit and the brake hose are supported by the same upper arm, so that the brake hose and the cushion unit do not interfere with each other even when the suspension swings. Furthermore, by mounting the cushion unit at a highly rigid position where the front and rear arms which constitute the upper arm cross each other, it is possible to bear the load of the cushion unit positively.

In the first aspect of the present invention, the caliper support portion is disposed radially outside with respect to the center of the piston. Therefore, it is possible to diminish the force acting on the brake caliper mounting portion and hence possible to decrease the strength of the caliper support portion. In addition, it is possible to reduce the size and weight of the caliper support portion, bracket and bolts for mounting the bracket to the caliper support portion. Furthermore, since the caliper support portion lies radially outside, mud, snow, etc. adhered to the inside of the wheel can be scraped off by the caliper support portion and it is not necessary to use any special member for removing such mud and snow, that is, a reduction of cost and of weight can be attained.

In the second aspect of the present invention, the saddle-ride type all terrain vehicle is a four-wheel drive vehicle. Therefore, by the above layout of the caliper support portion, a strong force acting on the brake caliper support portion in the four-wheel drive vehicle can be made weaker and it is possible to obtain a caliper support portion layout structure effective for the four-wheel drive vehicle.

In the third aspect of the present invention, a cover member for protecting the brake disc is provided. Therefore, the brake disc can be protected from flying gravel, etc. by the cover member and hence it is possible to improve the reliability of the vehicle.

In fourth aspect of the present invention, at the portion except a lower portion of the cover member, mud, flying gravel, etc. can be made more difficult to strike against the brake disc by the presence of the flange portion, while at the lower portion of the cover member, mud, flying gravel, etc. having entered between the brake disc and the cover member can be discharged easily. Thus, the reliability of the vehicle can be more improved.

In the fifth aspect of the present invention, mud, snow, etc. adhered to the inner surface of the wheel can be scraped off by the projection and it is not necessary to use any special member for removing such mud, snow, etc., whereby it is possible to reduce the number of parts and hence reduce the cost.

In the sixth aspect of the present invention, the projection is formed outside a portion projecting most radially outside of a body of the brake caliper. Therefore, mud, snow, etc. adhered to the inner surface of the wheel can be scraped off positively and hence it is possible to improve the running-through performance of the vehicle on an uneven road.

In the seventh aspect of the present invention, the projection edge lies on an extension line of the caliper bracket edge or projects from the caliper bracket edge. Therefore, mud, snow, etc. can be scraped off easily by the projection edge and there is no fear of mud, snow, etc. being accumulated between the inner surface of the wheel and the brake caliper.

In the eighth aspect of the present invention, the caliper bracket is mounted to the knuckle in at least two positions and at least two such projections as referred to above are formed so that their tips are equidistant from the center of wheel. Therefore, the caliper bracket can be used in common to both right and left disc brakes in the vehicle, whereby the number of parts is reduced and it is possible to attain a reduction of cost.

In the ninth aspect of the present invention, the hose support portion is provided on the king pin axis. Therefore, the brake hose can be bent around the hose support portion, and can be allowed to deflect only at the short distance from the hose support portion to the brake caliper. Consequently, the amount and range of movement of the brake hose can be made small and it is possible to prevent the brake hose from undergoing an excessively large deflection. As a result, it is possible to decrease the space around the brake hose and attain a reduction in size of the vehicle.

In the tenth aspect of the present invention, the brake hose is supported by the upper arm. Therefore, the lower arm serves as a guard member which covers the lower portion of the brake hose. In addition, it is possible to protect the brake hose from flying gravel and projections on a road surface.

In the eleventh aspect of the present invention, the upper arm is composed of a pair of a front arm and a rear arm and the brake hose is disposed along the rear arm. Therefore, the front arm in the upper arm serves as a guard member which covers the front portion of the brake hose, whereby the brake hose can be protected from flying gravel, etc. and thus a further improvement can be attained.

In the twelfth aspect of the present invention, one end of a cushion unit for cushioning a shock transmitted from each vehicular wheel to the vehicle body side is secured to the vehicle body side and an opposite end thereof is secured to the upper arm. Therefore, the lower end of the cushion unit and the brake hose are supported by the same upper arm, so that the brake hose and the cushion unit do not interfere with each other even when the suspension swings. Furthermore, by mounting the cushion unit at a highly rigid position where the front and rear arms which constitute the upper arm cross each other, it is possible to bear the load of the cushion unit positively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6(a) and 6(b) are explanatory diagrams of the brake caliper according to the present invention;

FIGS. 8(a) and 8(b) are operation diagram explaining a force acting on a connection between a knuckle and the brake caliper during braking;

FIGS. 10(a), 10(b) and 10(c) are explanatory diagrams comparing projections with respect to shape and operation;

FIGS. 13(a) and 13(b) are operation diagrams showing the operation of a comparative example of a brake hose supporting method.

DETAILED DESCRIPTION OF THE PREFERRED EMBODIMENTS

Figure 1:
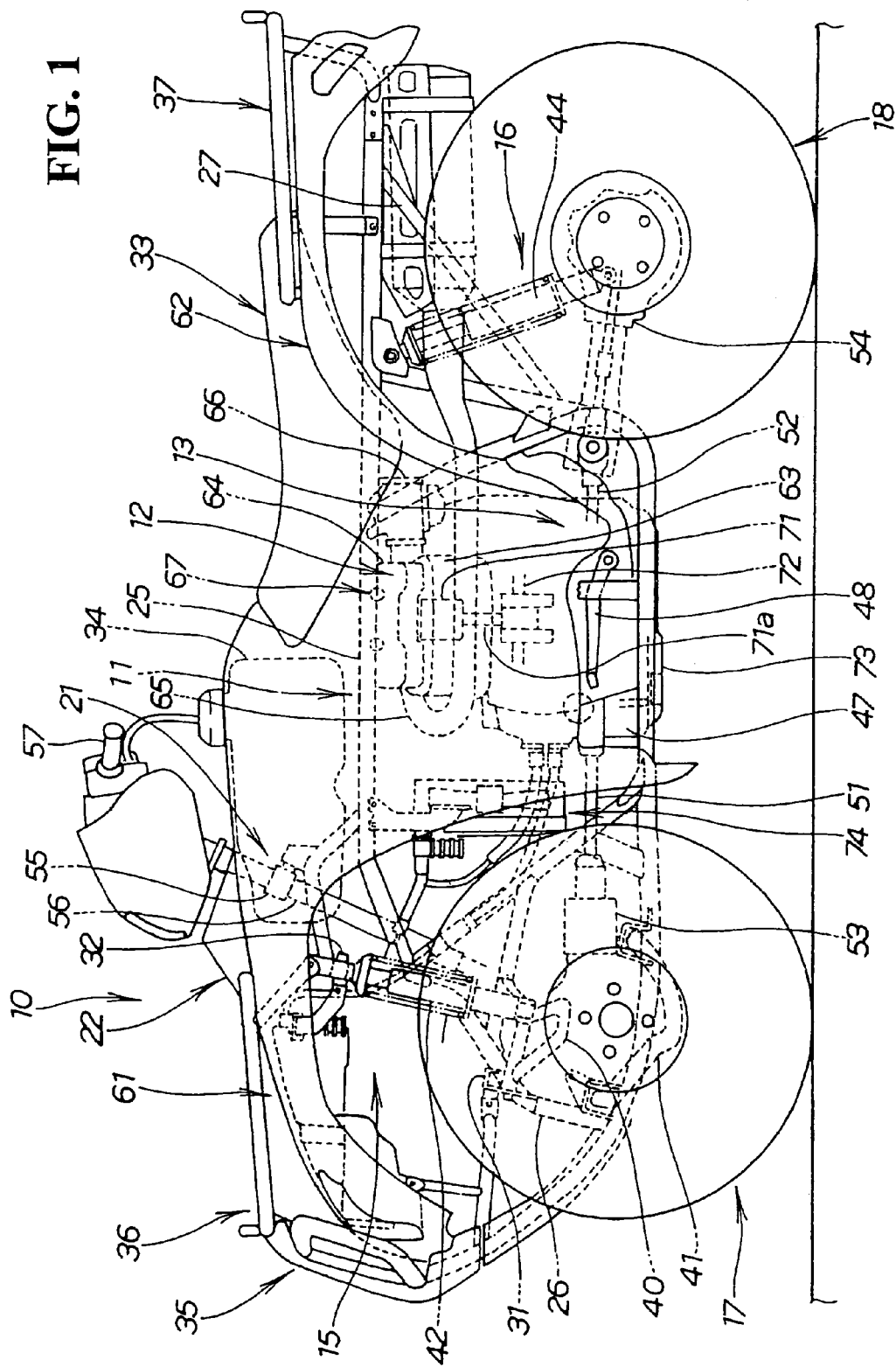
FIG. 1 is a side view of a saddle-ride type all terrain vehicle according to the present invention.

A best mode for carrying out the present invention will be described hereinunder with reference to the accompanying drawings. The drawings should be viewed in the direction of orientation of the reference numerals.

FIG. 1 is a side view of a saddle-ride type all terrain vehicle according to the present invention. The saddle-ride type all terrain vehicle, indicated at 10, (hereinafter referred to simply as the "all terrain vehicle 10"), includes a body frame 11, an engine 12 mounted on a central lower portion of the body frame 11, a power transmission system 13 connected to the engine 12 and mounted to the body frame 11, a front suspension 15 and a rear suspension 16 for suspending a pair of right and left front wheels 17, 17 (only the left side one is shown) and a pair of right and left rear wheels 18, 18 (only the left side one is shown), and a steering unit 21 connected to the front wheels 17, 17 and mounted to the body frame 11.

The body frame 11 includes a main frame 25, a front frame 26 and a rear frame 27 attached to front and rear portions, respectively, of the main frame 25. A bracket 31 is mounted between right and left of a lower portion of the front frame 26. A cross member 32 is mounted between right and left of an upper portion of the front frame 26. Numeral 33 denotes a seat mounted to the main frame 25, numeral 34 denotes a fuel tank, numeral 35 denotes a front guard mounted to the front frame 26, numeral 36 denotes a front carrier mounted to the front frame 26, and numeral 37 denotes a rear carrier mounted to a rear portion of the main frame 25.

The front suspension 15, which is a right and left independent suspension type, includes a pair of right and left front upper arms 40, 40 (only this-side one is shown), a pair of right and left front lower arms 41, 41 (only this-side one is shown), which upper and lower arms are mounted vertically swingably to the body frame 11, and a pair of right and left front cushion units 42 (only this-side one is shown) each mounted between each front upper arm 40 and the cross member 32.

The rear suspension 16 includes a rear cushion unit 44 mounted to the body frame 11.

The transmission system 13 includes a transmission 47 connected to an output shaft of the engine 12, a gear change pedal 48, a front drive shaft 51 and a rear drive shaft 52 connected to front and rear portions, respectively, of the transmission 47, a front final reduction gear unit 53 connected to the front drive shaft 51 and mounted to the body frame 11, and a rear final reduction gear unit 54 connected to the rear drive shaft 52.

The steering unit 21 includes a steering shaft 56 mounted to a front upper portion of the main frame 25 with use of a shaft holder 55, and a handlebar 57 mounted to the steering shaft 56. Numeral 61 denotes a front fender which covers upper portions of the front wheels 17, 17 and numeral 62 denotes a rear fender which covers upper portions of the rear wheels 18, 18.

The engine 12, which is a four-cycle engine, includes a cylinder block 63, a cylinder head 64 secured to an upper portion of the cylinder block 63, an exhaust system connected to a front portion of the cylinder head 64, a carburetor 66 mounted to a rear portion of the cylinder head 64, a valve operating mechanism 67 disposed within the cylinder head 64, a piston 71 inserted movably into the cylinder block 63, a crank shaft 72 connected to the piston 71 through a connecting rod 71a, an oil pan 73 disposed under the cylinder block 63, and a cooling fan 74 disposed in front of the engine 12 to forcibly cool the engine 12 with air.

Figure 2:
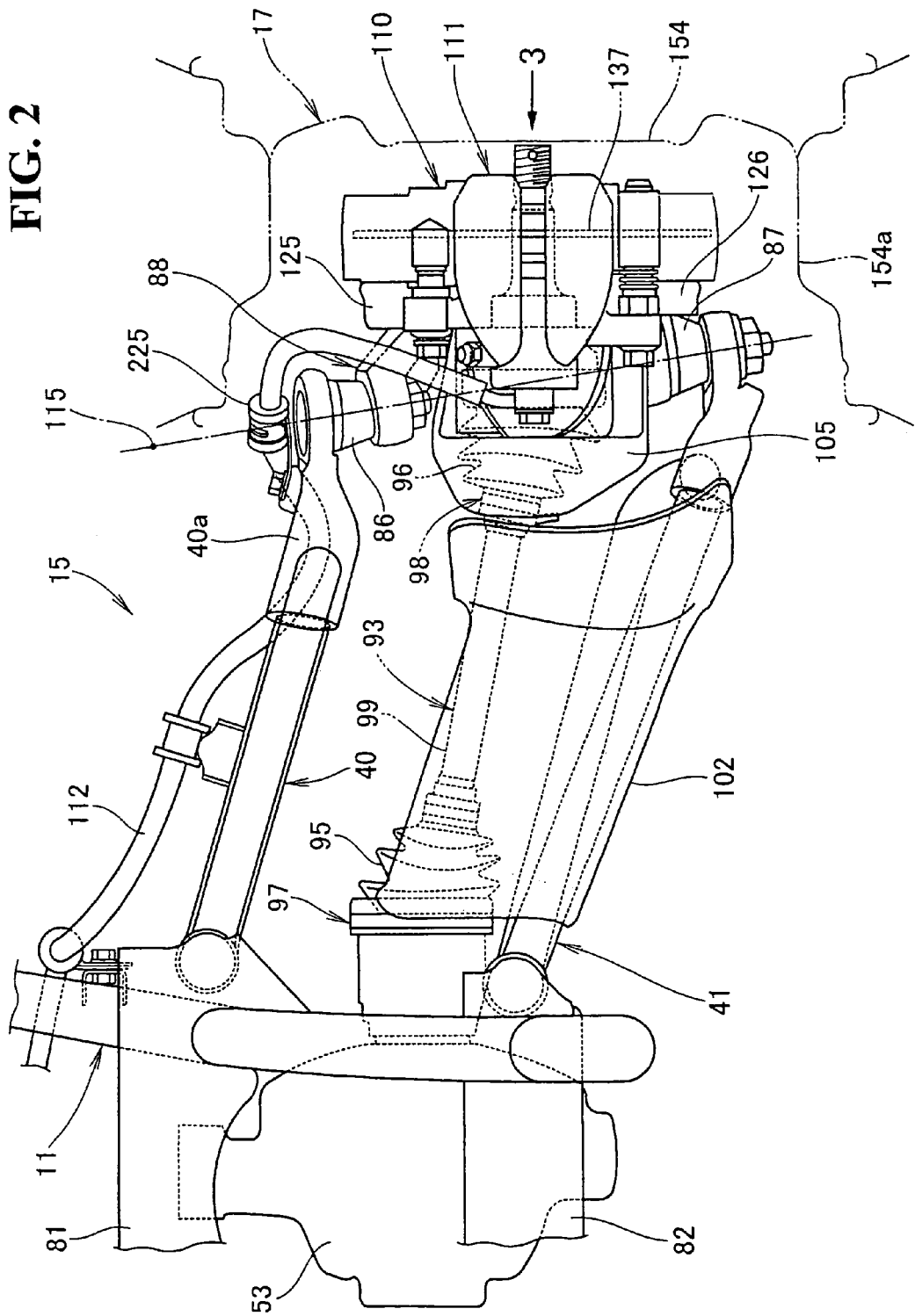
FIG. 2 is a front view of a principal portion of a front suspension for the all terrain vehicle according to the present invention.

FIG. 2 is a front view of a principal portion of the front suspension for the all terrain vehicle according to the present invention. Only the portion of the front suspension 15 which suspends the left front wheel 17 is shown. An illustration of the portion of the front suspension 15 which suspends the right front wheel 17 is omitted.

The front suspension 15 includes three arm support portions 81, 82, 82 (the arm support portion 82 disposed on the inner side is not shown) bridgewise mounted right and left in a front portion of the body frame 11. Each front upper arm 40 is connected vertically swingably to ends of the arm support portions 81, 81. Each front lower arm 41 is connected vertically swingably to ends of the arm support portions 82, 82. A knuckle 88 is connected to tip ends of the front upper arm 40 and the front lower arm 41 through ball joints 86 and 87. A hub (not shown) is attached to the knuckle 88 rotatably. Each front cushion unit 42 (see FIG. 1) is connected bridgewise to the body frame 11 and the front upper arm 40, with the associated front wheel 17 being secured to the hub.

The knuckle 88 includes a first arm 125 and a second arm 126. A brake caliper 111 of a disc brake 110 is attached to the first and second arms 125, 126.

The disc brake 110 includes a brake disc 137 attached to a hub and the brake caliper 111 which brakes the brake disc 137 in a sandwiching relation to the brake disc. The disc brake 110 is a so-called wheel-in type completely received within a wheel 154 which constitutes each front wheel 17.

The front final reduction gear unit 53 is connected to a front end of the front drive shaft 51 (see FIG. 1) which is extended forward from a lower portion of the transmission 47 (see FIG. 1). Power is transmitted from the front final reduction gear unit 53 to the hub through a driver shaft 93 to drive the associated front wheel 17.

Indicated at 95 and 96 are rubber boots which cover constant velocity joints 97 and 98 mounted on both end portions of the drive shaft 93. A front portion and a front and obliquely lower portion respectively of one rubber boot 95 and a shaft connected bridgewise between the constant velocity joints 97 and 98 are covered with an inboard-side guard member 102 secured to the associated front arm 41, while a front portion of the other rubber boot 96 is covered with an outboard-side guard member 105 secured to the knuckle 88.

Numeral 112 in the drawing (see FIG. 1) is a brake hose connected bridgewise between a master cylinder (not shown) provided on the handlebar 57 (see FIG. 1) side and the brake caliper 111. The brake hose 112 is fixed at intermediate positions to the associated front upper arm 40 and the body frame 11. Particularly, one of the fixed portions of the brake hose 112, (more particularly a third bracket 225 to be described later), is disposed above an end portion 40a of the front upper arm 40 and on a king pin axis 115 joining the centers of the ball joints 86 and 87.

Figure 3:
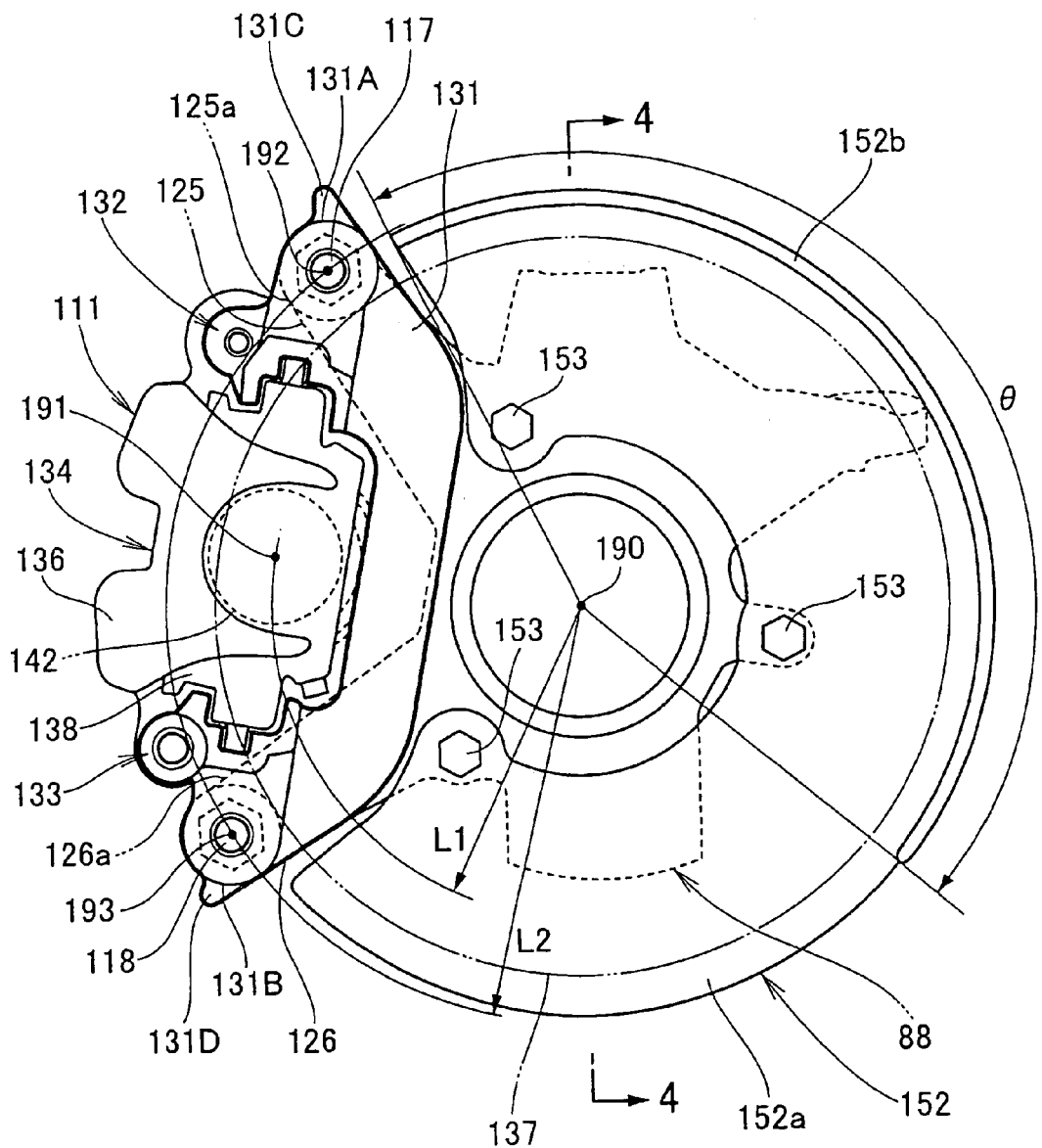
FIG. 3 is a view as seen in the direction of arrow 3 in FIG. 2.

FIG. 3 is a view as seen in the direction of arrow 3 in FIG. 2 (the arrow FRONT in FIG. 3 represents the front side of the vehicle and this also applies in the following), showing that the brake caliper 111 is secured with bolts 117 and 118 to the first arm 125 and the second arm 126 (more particularly, a first caliper support portion 125a formed at an end of the first arm portion 125 and a second caliper support portion 126a formed at an end of the second arm portion 126) which are provided in the knuckle 88.

The brake caliper 111 includes a caliper bracket 131 (the portion whose profile is indicated by a thick line) secured to the first and second arms 125, 126 and a caliper assembly 134 connected to the caliper bracket 131 through a first connecting portion 132 and a second connecting portion 133.

Numeral 131A denotes a first mounting portion provided in the caliper bracket 131 for mounting to the caliper support portion 125a of the first arm 125 and numeral 131B denotes a second mounting portion provided in the caliper bracket 131 for mounting to the second caliper support portion 126a of the second arm 126.

The caliper assembly 134 includes a caliper body 136 connected to the caliper bracket 131, a pair of pads 138 and 141 (only this-side one 138 is shown) disposed inside the caliper body 136, the pads 138 and 141 sandwiching a brake disc 137 from both sides, and a piston 142 accommodated movably within the caliper body 136 to push the pads 138 and 141.

Given that the center of each front wheel 17 (see FIG. 1) is a point 190, the center of the piston 142 is a point 191, the axis of the bolt 117 is a point 192, the axis of the bolt 118 is a point 193, the distance from the point 190 to the point 191 is L1, and the distance from the point 190 to the point 192 (or point 193) is L2, the distance L2 is larger than the distance L1 (L2>L1). That is, the bolts 117 and 118 for mounting the brake caliper 111 to the knuckle 88 are disposed radially outside with respect to the center of the piston 142. As a result, when the brake is applied and a braking torque acts on the pads 138 and 141 (more particularly, positions of the pads 138 and 141 corresponding to a central position of the piston 142), it is possible to diminish loads generated on the bolts 117 and 118.

Figure 4:
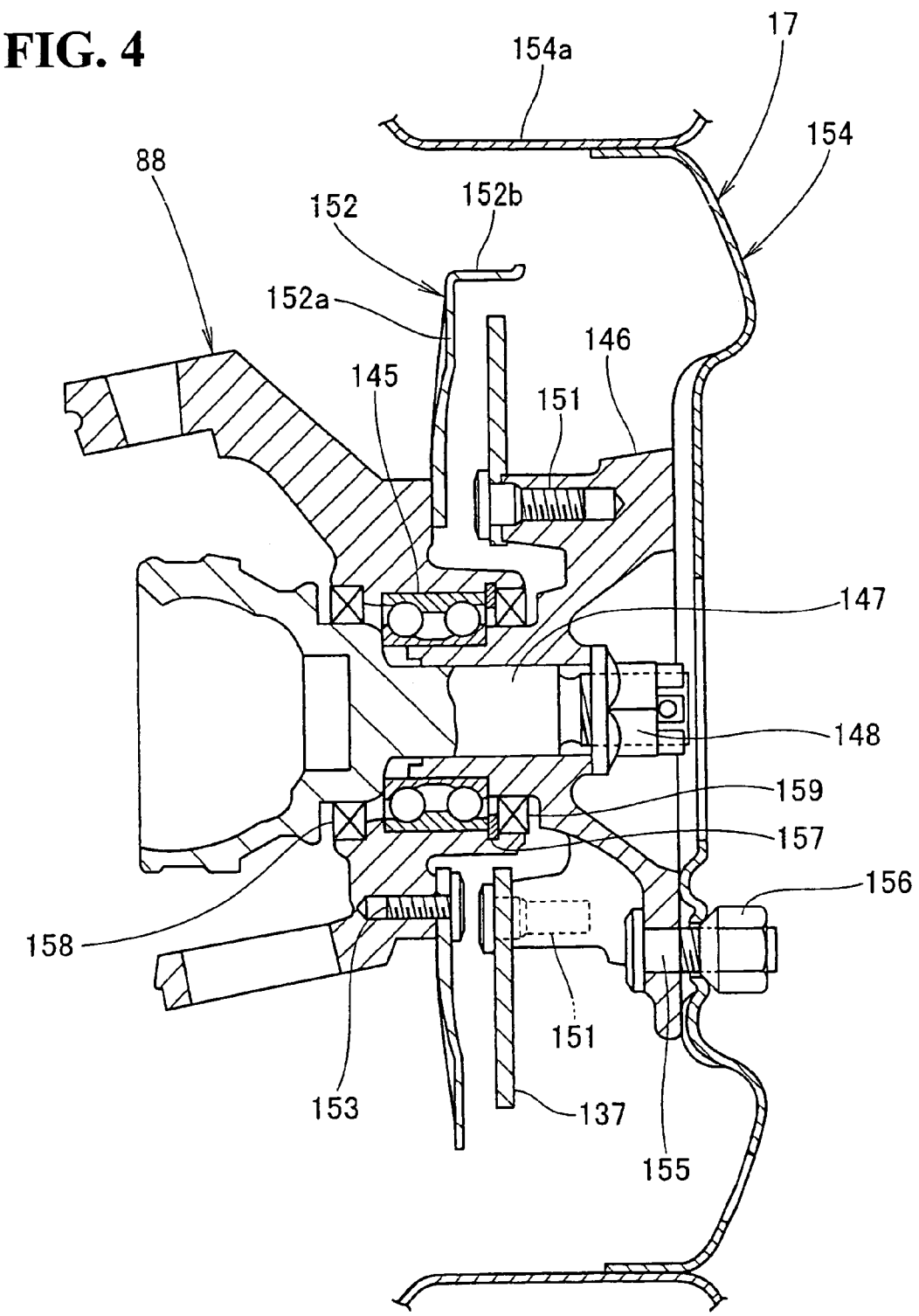
FIG. 4 is a sectional view taken on line 4-4 in FIG. 3.

FIG. 4 is a sectional view taken on line 4-4 in FIG. 3, showing that a hub 146 is mounted to the knuckle 88 rotatably through a bearing 145. An axle 147 integral with the constant velocity joint 98 (see FIG. 2) is splined and secured with a nut 148 to the inside of the hub 146. The brake disc 137 is secured to the hub 146 with plural bolts 151. A cover member 152 is secured to the knuckle 88 with plural bolts 153 to cover the brake disc 137 from the inside. Numeral 154 denotes a wheel secured to the hub 146 with plural bolts 155 and a plurality of wheel nuts 156, numeral 154a denotes a rim of the wheel 154, numeral 157 denotes a snap ring, and numerals 158 and 159 denote dust seals.

The cover member 152 includes a disc portion 152a extending radially outward and a flange portion 152b formed on part of an outer periphery edge of the disc portion 152a. Referring back to FIG. 3, the flange portion 152b is formed on the disc portion 152a at its portion other than an outer periphery edge of a lower portion thereof, i.e., on outer periphery edges of upper and rear portions of the disc portion 152a (more particularly, the range of angle θ).

Figure 5:
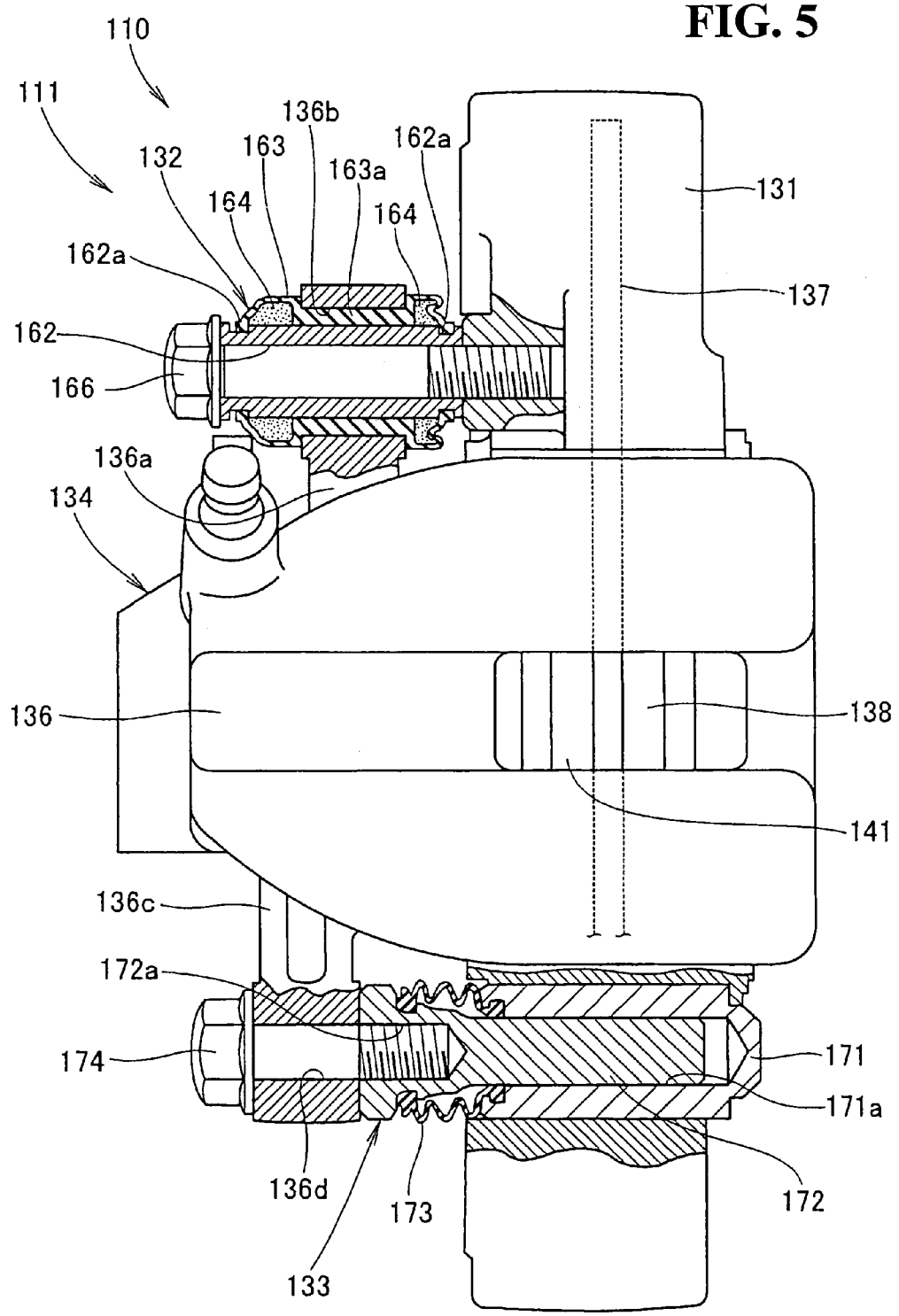
FIG. 5 is a sectional view showing a brake caliper for the all terrain vehicle according to the present invention.

FIG. 5 is a sectional view (partially a front view) of the brake caliper for the all terrain vehicle according to the present invention, showing the first connecting portion 132 and the second connecting portion 133 for connecting the caliper assembly 134 to the caliper bracket 131.

The first connecting portion 132 includes a sleeve 162 having annular grooves 162a, 162a formed in both end portions thereof, a rubber bushing 163 fitted in the annular grooves 162a, 162a of the sleeve 162, grease 164 filled between the sleeve 162 and the bushing 163 to lubricate the two, and a connecting bolt 166 inserted through the interior of the sleeve 162. The connecting bolt 166 is threadedly engaged with the caliper bracket 131 and a thick-walled cylindrical portion 163a of the boot 163 is fitted in an arm portion 136a (more particularly, a fitting hole 136b formed in the arm portion 136a) provided in the caliper body 136.

The second connecting portion 133 includes a sleeve 171 press-fitted in the caliper bracket 131. A slide pin 172 is inserted slidably into a slide hole 171a formed in the sleeve 171. A rubber boot 173 which closes a gap between the sleeve 171 and the slide pin 172, and a mounting bolt 174 for mounting the slide pin 172 to an arm portion 136c (more particularly, a fitting hole 136d formed in the arm portion 136c) are provided in the caliper body 136. Numeral 172a denotes internal threads formed in the slide pin 172 for threaded engagement with the mounting bolt 174.

The brake caliper 111 is a caliper floating type wherein the caliper assembly 134 is held in a floating state relative to the caliper bracket 131. The caliper assembly 134 moves leftward or rightward in the drawing with a reaction force of the urging force of the piston 142 (see FIG. 3) relative to the caliper bracket 131 in a state in which in the first connecting portion 132 the caliper bracket 131 and the caliper body 136 are in rubber contact with each other, while in the second connecting portion 133 the caliper bracket 131 and the caliper body 136 are in metal contact with each other.

Consequently, in FIG. 4, when the hub 146 tilts relative to the knuckle 88 under the action of an external force and there occurs a fall of the brake disc 137, it is possible to let the caliper assembly 134 follow up the fall of the brake disc 137 on the first connecting portion 132 side while guiding the movement of the caliper assembly 134 relative to the caliper bracket 131 on the second connecting portion 133 side in FIG. 5. Thus, the pads 138 and 141 can be kept in close contact with the brake disc 137 to improve the braking performance.

FIGS. 6(a) and 6(b) are explanatory diagrams explaining the brake caliper for the all terrain vehicle according to the present invention. FIG. 6(a) is a back view of the brake caliper 111 shown in FIG. 3. Of the first and second connecting portions 132, 133 for connecting the caliper assembly 134 to the caliper bracket 131, the first connecting portion 132 is positioned on the side (so-called incoming side) where the brake disc 137 rotating in the direction of forward rotation (i.e., the rotational direction in a forward movement of vehicle) gets into the caliper assembly 134, while the second connecting portion 133 is positioned on the side (so-called outgoing side) where the brake disc 137 rotating in the direction of forward rotation gets out of the caliper assembly 134.

The caliper bracket 131 is formed with projections 131C and 131D projecting substantially radially outwards adjacent to the first and second mounting portions 131A, 131B, respectively. The distance (i.e., radius) from the center of each front wheel 17 (see FIG. 2) to an outer surface 136e (more particularly, a most radially outwardly projecting portion of the outer surface 136e) of the caliper body 136 (the portion whose profile is indicated by a thick line) is R1 and the distance (i.e., radius) from the center of the front wheel 17, which is also the center of the wheel 154 (see FIG. 2), to the tip of the projection 131C (or the projection 131D) is R2. The distance R2 is larger than the distance R1 (R2>R1) and the difference P between the distances R1 and R2 corresponds to a projecting quantity of the projections 131C and 131D from the outer surface 136e.

The caliper body 136 is provided in a side face thereof with a hose connecting hole 177 (an internally threaded portion) for connection thereto of the brake hose 112 (see FIG. 2). Numeral 178 denotes an air vent hole for discharging air from the cylinder provided within the caliper body 136, numeral 181 denotes a mouthpiece provided in the opening of the air vent hole 178, and numeral 182 denotes a cap applied to the mouthpiece 181.

FIG. 6(b) is a sectional view of the brake caliper 111 taken along the paper surface, showing that the pad 138 is integrally formed with projecting portions 138a and 138b projecting in the longitudinal direction (substantially, in the rotational direction of the brake disc 137), an aperture 131a for the pad 138 is formed in the caliper bracket 131, and engaging cutout portions 131b and 131c for engagement with the projecting portions 138a and 138b are formed in the aperture 131a.

The projecting portions 138a, 138b and the engaging cutout portions 131b, 131c are torque receiving portions which receive a braking torque when the brake disc 137 rotating is braked by being pinched between the pads 138 and 141 (see FIG. 5). Since the arrow in the drawing indicates the direction of forward rotation, the projecting portion 138b and the engaging cutout portion 131c are torque receiving portions in the direction of forward rotation, while the projecting portion 138a and the engaging cutout portion 131b are torque receiving portions in the direction of reverse rotation. Numeral 184 denotes a leaf spring interposed between the aperture 131a and the pad 138 to prevent wobbling of the pad 138 when the pad 138 is disposed within the aperture 131a.

Figure 7:
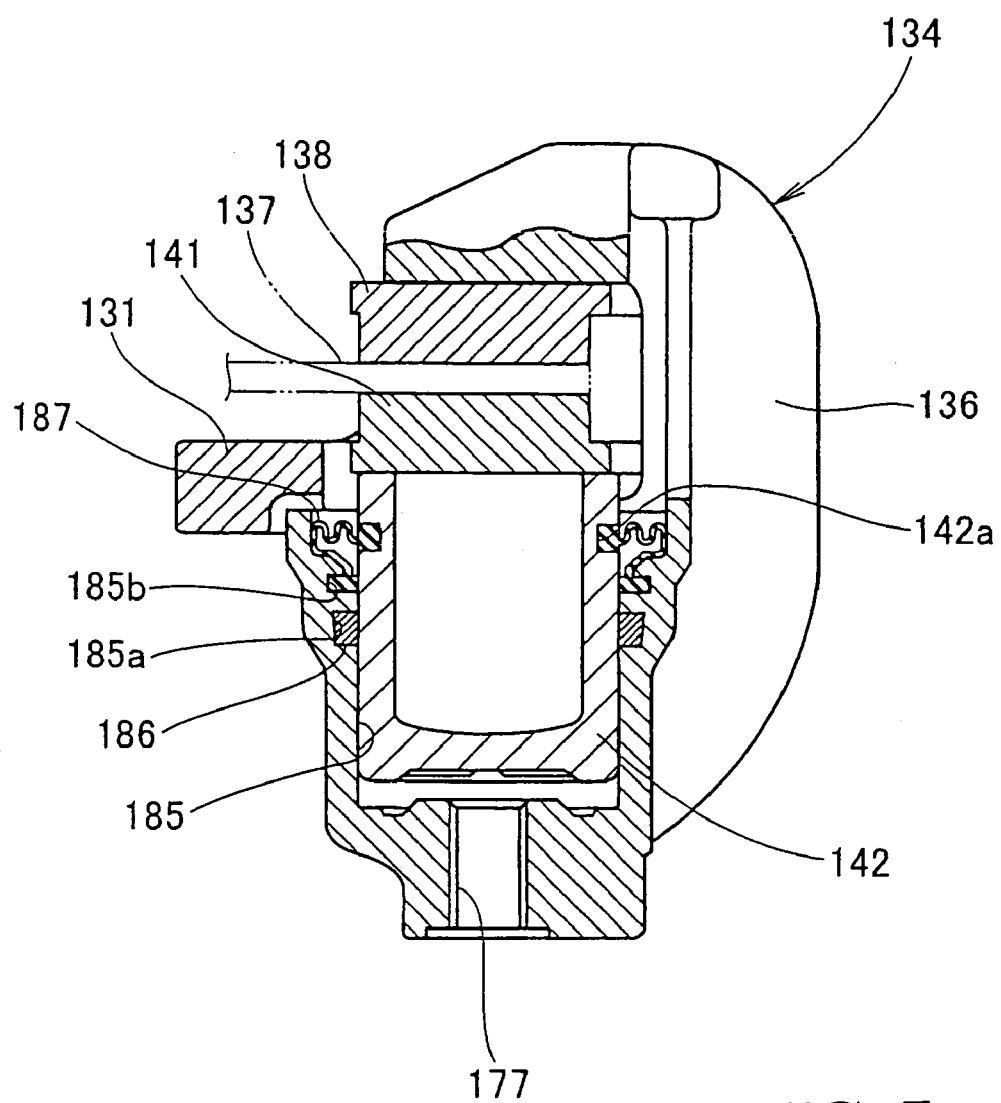
FIG. 7 is a sectional view taken on line 7-7 in FIG. 6(a)

FIG. 7 is a sectional view taken on line 7-7 in FIG. 6(a). The caliper assembly 134 includes a cylinder bore 185 formed within the caliper body 136 and the piston 142 disposed movably within the cylinder bore 185 to push the pads 138 and 141 (imparts a reaction force to the pad 141). Numeral 186 denotes a sealing member fitted in an annular groove 185a formed in the cylinder bore 185 to seal between the cylinder bore 185 and the piston 142. Numeral 187 denotes a boot connected bridgewise between an annular groove 185b, the annular groove 185b being formed to prevent the entry of dust, muddy water, etc. in between the cylinder bore 185 and the piston 142, and an annular groove 142a formed in an outer periphery surface of the piston 142.

FIGS. 8(a) and 8(b) are operation diagrams each explaining a force acting on the connection between the knuckle and the brake caliper during braking.

In a working example (this embodiment) shown in FIG. 8(a), the distance from the center (point 190) of each wheel to the center (point 191) of the piston 142 is L1 and distance from the wheel center to the axis (point 192) of the bolt 117 on the first mounting portion 131A side of the caliper bracket 131 and the distance from the wheel center to the bolt 118 (point 193) on the second mounting portion 131B side of the caliper bracket 131 are each L2. Then, when a brake fluid pressure is exerted on the piston 142 to brake the brake disc with pads, the brake torque TB at this time becomes equal to F·L1, assuming that the brake load on the piston 142 is F1. Further, the load F1 generated on the bolts 117 and 118 becomes equal to TB/(2·L2).

A comparative example of FIG. 8(b) shows that the distance from the wheel center to the piston 142 is the same distance L1 as in the working example of FIG. 8(a) and that the distance L3 from the wheel center to the axis (here indicated at point 392) of a bolt 317 and from the wheel center to the axis (here indicated at point 393) of a bolt 318 is shorter than the distance L2 shown in FIG. 8(a).

In this case, when a braking load F acts on the piston 142 upon braking, a load F2 generated on the bolts 317 and 318 become equal to TB/(2·L3). As noted above, since L3<L2, the load F2 becomes larger than the load F1 shown in FIG. 8(a). Therefore, it is necessary to enhance the strength of the bolts 317, 318, the strength of the first and second mounting portions 131A, 131B and the strength of the knuckle.

In the present invention, as shown in FIG. 8(a), since the distance from the wheel center to each of the bolts 117 and 118 is set longer than the distance from the wheel center to the center of the piston 142, the load F1 (a shear load) acting on the bolts 117 and 118 can be made smaller. Consequently, it becomes possible to decrease the strength of the bolts 117 and 118, that of the first and second mounting portions 131A, 131B of the caliper bracket 131 and that of the caliper support potions 125a and 126a (see FIG. 3) of the knuckle 88, thus making it possible to attain the reduction in size and weight of the bolts 117, 118, caliper bracket 131 and knuckle 88.

Figure 9B:
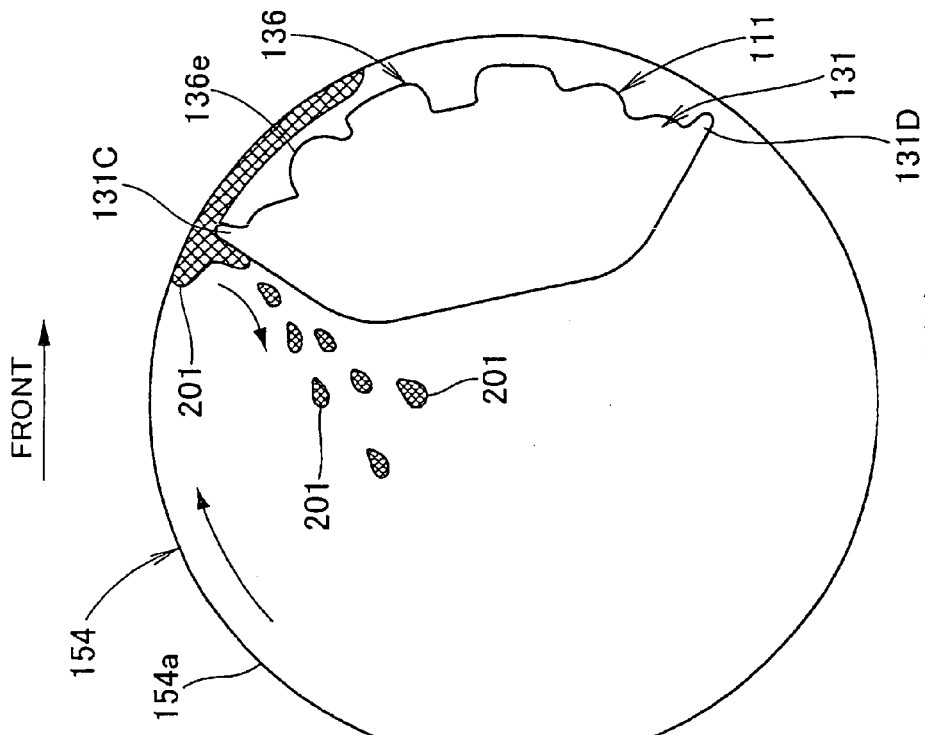
FIGS. 9(a) and 9(b) are operation diagrams showing the operation of projections of a caliper bracket for the all terrain vehicle according to the present invention.
Figure 9A:
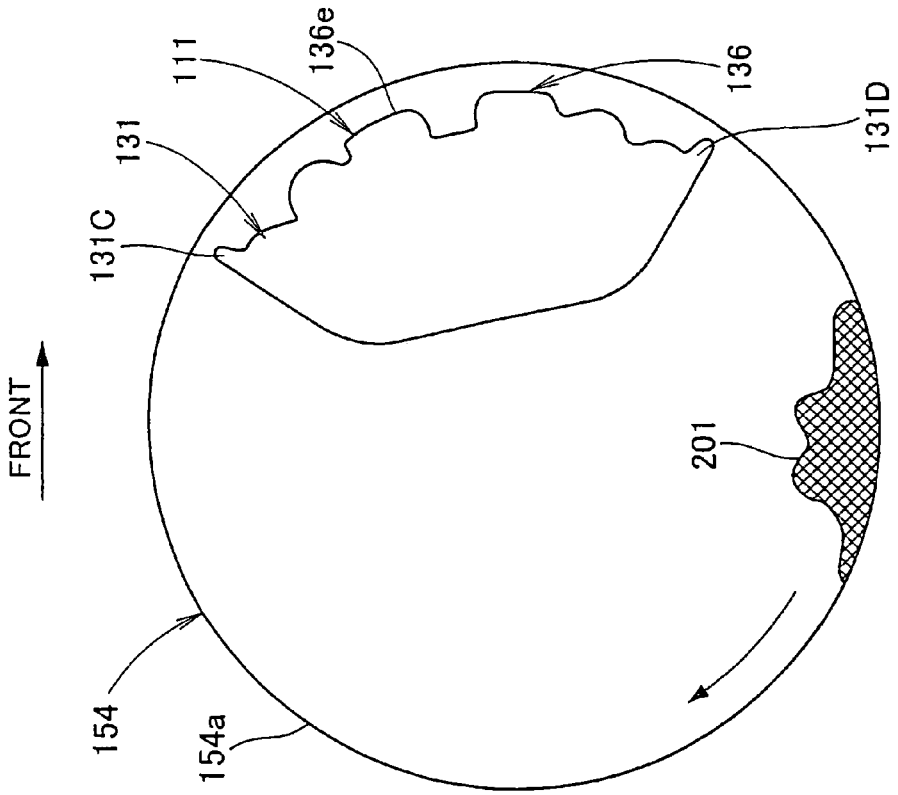

Next, a description will be given below about the operation of the projections 131C and 131D in the caliper body described above. FIGS. 9(a) and 9(b) are operation diagrams showing how the projections of the caliper bracket for the present invention operate.

FIG. 9(a) shows a state in which the brake caliper 111 is disposed inside the rim 154a of the wheel 154 and FIG. 9(b) shows a state in which the wheel 154 has rotated from the state of FIG. 9(a). In FIG. 9(a), for example, if the wheel 154 rotates in the direction of arrow (forward rotation) in a state in which snow 201 (or ice, mud) accumulated on the inner surface of the rim 154a in the all terrain vehicle, then in FIG. 9(b), the snow 201 is scraped off by the projection 131C of the caliper bracket 131 and does not strike against the outer surface 136e of the caliper body 136.

When in FIG. 9(a), the wheel 154 rotates in the direction (reverse rotation) opposite to the direction of arrow, then in FIG. 9(b), the snow 201 is scraped off by the projection 131D of the caliper bracket 131.

Thus, since the projections 131C and 131D projecting from the outer surface 136e of the caliper body 136 are provided in the caliper bracket 131, the snow 201, etc. accumulated on the inner surface of the rim 154a can be scraped off easily by the projections 131C and 131D. It is possible to prevent the snow 201, etc. from being stuck between the caliper body 136 and the rim 154a.

Since the tips of the projections 131C and 131D are equidistant from the center of the wheel 154, the snow 201 can be scraped off by the projection 131D in the same manner as is done by the projection 131C when the caliper bracket 131 is used in commonly both right and left disc brakes.

FIGS. 10(a) to 10(c) are explanatory diagrams in which projections are compared with one another with respect to shape and operation. FIG. 10(a) is the working example shown in FIG. 9, in which a side face 131d of the projection 131C lines on an extension line of a side face 131f of the caliper bracket 131. This is also the case with the projection 131D (see FIG. 9(a)).

FIG. 10(b) shows another embodiment, in which a side face 205a of a projection 205 includes a side face 205b which lies on an extension line of the side face 131f of the caliper bracket 131 and a side face 205c which is inclined at an angle of θ1 from the side face 205b (i.e., projected from the side face 205b).

Thus, by providing the projecting side face 205c in the projection 205, the snow 201 can be scraped off more easily.

FIG. 10(c) shows a projection 321 as a comparative example. A side face 321a of the projection 321 includes a side face 321b which lies on an extension line of the side face 131f of the caliper bracket 131 and a side face 321c which is inclined at an angle of θ2 from the side face 321b (that is, retreated from the side face 321b).

By thus providing the projection 321 with the retreated side face 321c, the snow 201 becomes easier to get in between the projection 321 and the inner surface of the rim 154a and difficult to be scraped off.

Figure 11:
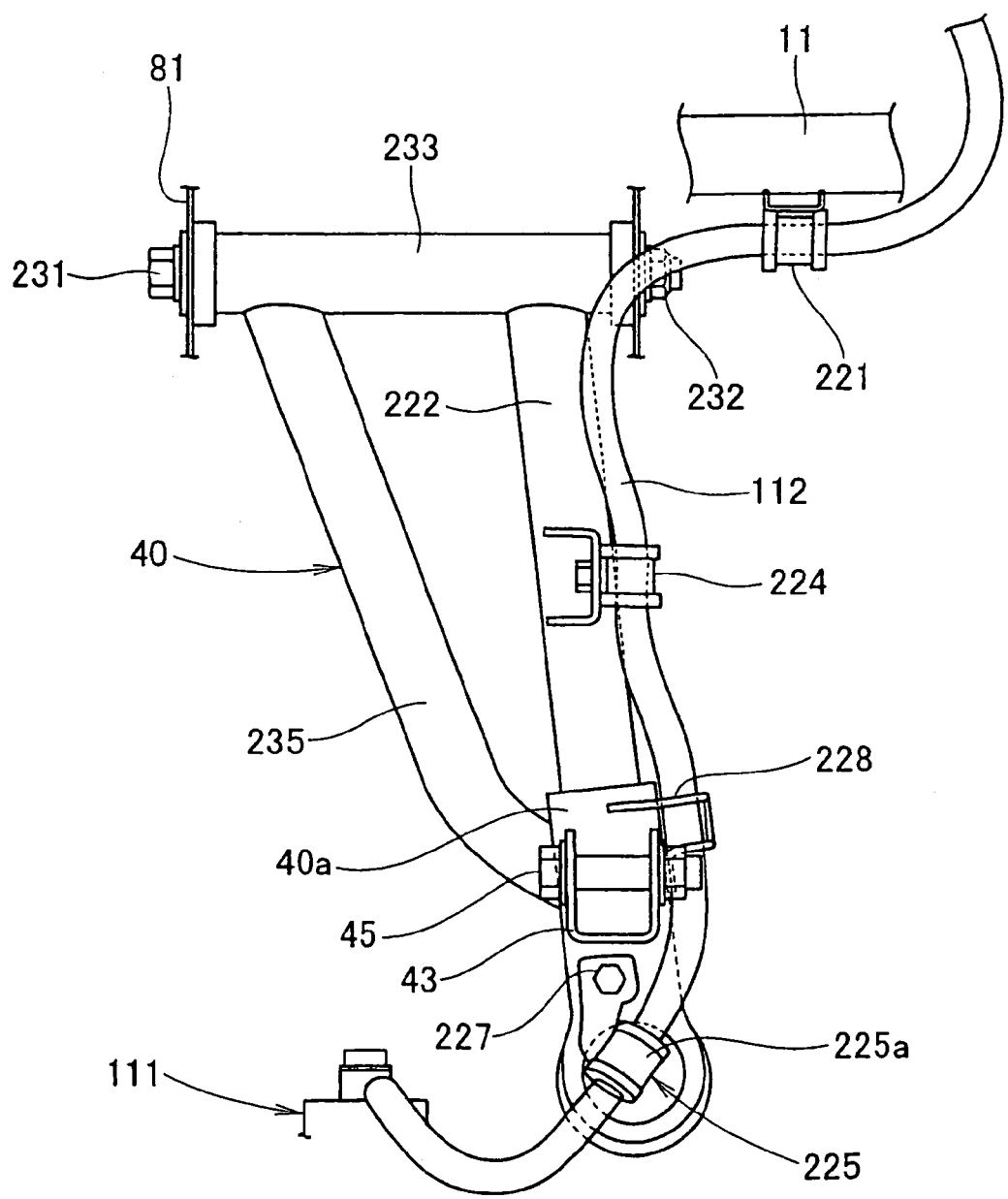
FIG. 11 is a plan view showing a brake hose support structure for the all terrain vehicle according to the present invention.

FIG. 11 is a plan view showing the brake hose support structure for the all terrain vehicle according to the present invention, showing that the brake hose 112 is supported from the body frame 11 side along the front upper arm 40 and that a front end of the brake hose 112 is connected to the brake caliper 111.

More specifically, in FIG. 11, a first bracket 221 is attached to the body frame 11, a second bracket 224 and a third bracket 225 are attached to a rear arm 222 as a constituent of each front upper arm 40, the brake hose 112 is fixed by the first, second and third brackets 221, 224, 225, and a brake hose fixing portion 225a of the third bracket 225 is disposed above a front end portion 40a of the rear arm 222, that is, on an extension line of the king pin axis 115 (see FIG. 2). FIG. 11 further shows that the brake hose 112 is passed behind the cushion support bracket 43, more particularly, behind the front end portion 40a. Numeral 227 denotes a bolt for mounting the third bracket 225 to the front end portion 40a and numeral 228 denotes a hose holding piece attached to the front end portion 40a to prevent deflection of the brake hose 112 between the second bracket 224 and the third bracket 225.

The front upper arm 40 includes a body mounting portion 233 attached rotatably with bolts 231 and nuts 232 to the arm support portion 81, the rear arm 222 extending sideways of the vehicle from the body mounting portion 33, and a front arm 235 connected bridgewise from the body mounting portion 233 to the front end portion 40a of the rear arm 222. Numeral 45 denotes a bolt for connecting each front cushion unit 42 to a cushion support bracket 43.

Thus, even with the cushion support bracket 43 attached to an upper surface of the front end portion 40a of each upper arm 40 (i.e., a highly rigid portion where the front arm 235 and the rear arm 222 are joined to each other), the cushion support bracket 43 and the third bracket 225 are at spaced positions from each other as shown in FIGS. 2 and 11, so that it is possible to prevent interference between the cushion support bracket 43 and the brake hose 112.

Figure 12A:
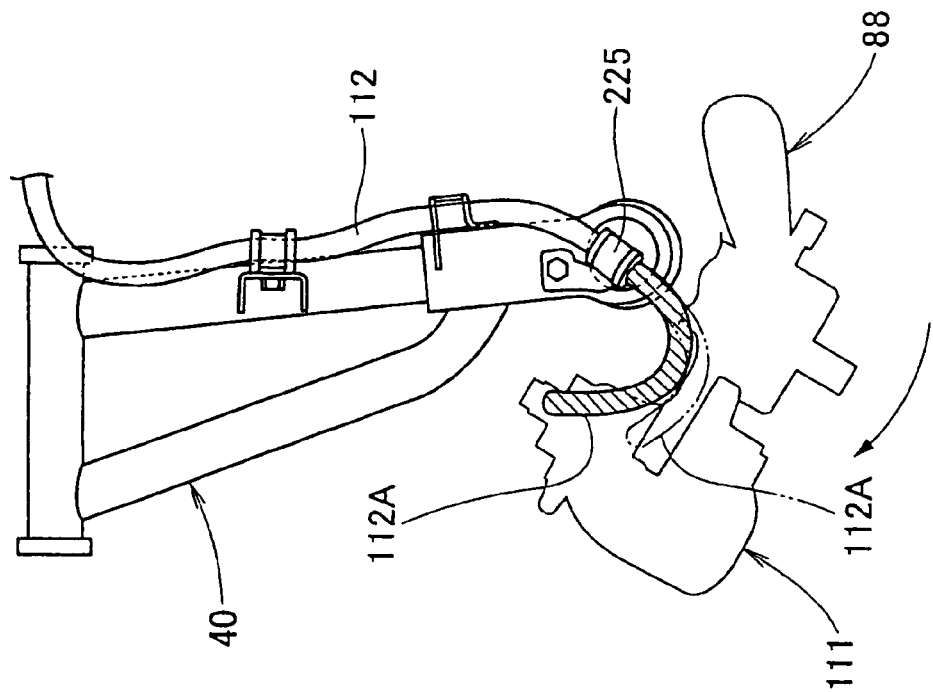
FIGS. 12(a) and 12(b) are operation diagrams showing the operation of a brake hose used in the all terrain vehicle according to the present invention.
Figure 12B:
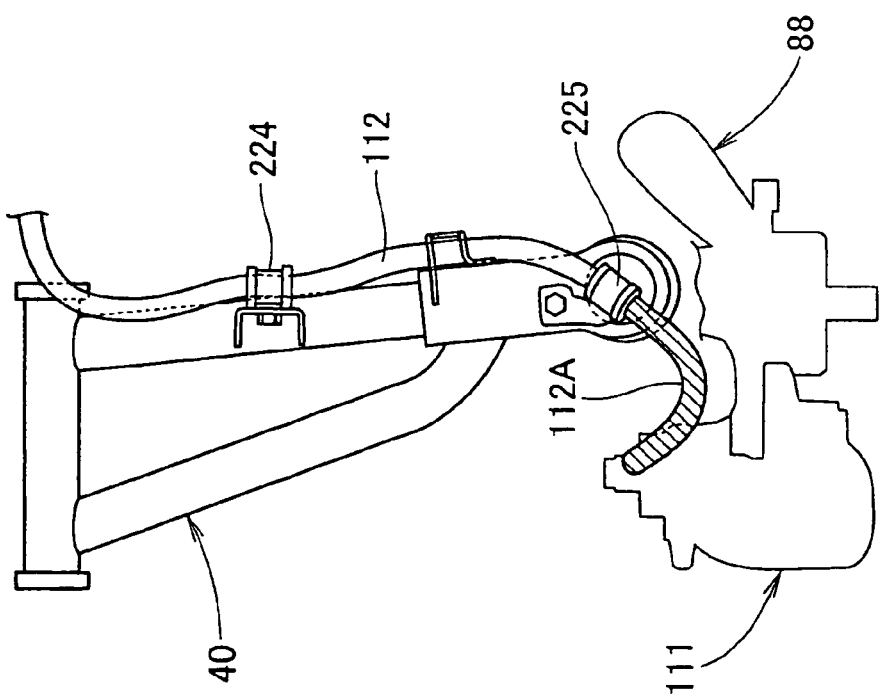

An operation of the brake hose 112 described above will be explained below. FIGS. 12(a) and 12(b) are operation diagrams showing the operation of the brake hose used in the all terrain vehicle according to the present invention.

FIG. 12(a) shows the brake hose 112 in a non-steered state, i.e., in a state in which the front wheels face in a straight-ahead direction. A portion of the brake hose 112 located on the front end side with respect to the third bracket 225 is here designated a front end portion 112A, which is hatched so that the shape thereof can be grasped easily.

In FIG. 12(b), when steering is performed, the knuckle 88 and the brake caliper 111 move in the direction of arrow around the king pin axis 115 (see FIG. 2) and the front end portion 112A of the brake hose 112 moves while bending, centered on the third bracket 225 (the phantom line indicates the front end portion 112A before movement which is shown in FIG. 12(a)). Thus, the amount of movement, especially the amount of movement at an intermediate position, of the front end portion 112A is small and an entire movement range of the front end portion 112A is also small.

FIGS. 13(a) and 13(b) are operation diagrams showing the operation of a brake hose supporting method as a comparative example. In both figures, the same portions as in FIG. 12 are identified by the same reference numerals as in FIG. 12 and detailed explanations thereof will be omitted.

FIG. 13(a) shows a state in which a third bracket 325 is mounted to the front end portion 40a of the front upper arm 40 at a position close to the center of the vehicle body (i.e., a position close to the upper side in the figure). In the illustrated example, the front end side of the brake hose 112 is designated a front end portion 112B and is hatched.

In FIG. 13(b), when steering is performed, the knuckle 8 and the brake caliper 111 rotate in the direction of arrow around the king pin axis 115 (see FIG. 2). With this rotation, the amount of movement of the front end portion 112B of the brake hose 112, especially the amount of movement at an intermediate position of the front end portion 112B, is large and the range of the movement is also large (the phantom line indicates the front end portion 112B before movement which is shown in FIG. 13(a)). Therefore, it is necessary to dispose the brake hose 112 so as not to interfere with surrounding parts.

As described above in connection with FIGS. 3, 4, 7 and 8, according to the first aspect of the present invention, in a brake caliper support structure for the saddle-ride type all terrain vehicle 10 (see FIG. 1) wherein the hub 146 is mounted rotatably to the knuckle 88, the wheel 154 which constitutes each front wheel 17 (see FIG. 1) and the brake disc 137 are secured to the hub 146, and the disc brake 110 having the brake caliper 111 for braking the brake disc 137 in a sandwiching relation to the brake disc is disposed inside the wheel 154, the brake caliper 111 including a pair of pads 138 and 141 for sandwiching the brake disc 137 therebetween, the piston 142 for pushing the pads 138 and 141, the caliper body 136 which accommodates the piston 142 movably, and the caliper bracket 131 secured to the first and second caliper support portions 125a, 126a which constitute the caliper support portion provided in the knuckle 88 for supporting the caliper body 136 movably, the distance L2 from the center of the each front wheel 17 to each of the caliper support portions 125a and 126a (their positions are the same as the positions of the first and second mounting portions 131A, 131B of the caliper bracket 131 or the positions of the bolts 117 and 118, all of which are subject to a load induced by a braking torque) is set longer than the distance L1 from the point 190 as the center of each front wheel 17 to the point 191 as the center of the piston 142.

The caliper support portions 125a and 126a are disposed radially outside with respect to the center of the piston 142.

Therefore, the force (i.e., load F1) acting on the mounting portions (i.e., the caliper support portions 125a, 126a, the first and second mounting portions 131A, 131B of the caliper bracket 131, the bolts 117 and 118) of the brake caliper 111 can be made small and hence the strength of the caliper support portions 125a and 126a can be made low. Therefore, it is possible to attain the reduction in size and weight of the caliper support portions 125a, 126a, the caliper bracket 131, and the bolts 117 and 118 for mounting the caliper bracket 131 to the caliper support portions 125a and 126a. Moreover, since the caliper support portions 125a and 126a are located radially outside, mud, snow, etc. adhered to the wheel 154 of each front wheel 17, more particularly, adhered to the inside of the rim 154a can be scraped off, not requiring any special member for removing such mud and snow, whereby it is possible to attain the reduction of cost and weight.

According to the second aspect of the present invention, the saddle-ride type all terrain vehicle 10 is a four-wheel drive vehicle.

The saddle-ride type all terrain vehicle 10 is a four-wheel drive vehicle. Therefore, it is possible to diminish the large force acting on the caliper support portions 125a and 126a in the four-wheel drive vehicle with the above arrangement of the caliper support portions 125a and 126a. Thus, a layout structure of the caliper support portions 125a and 126a effective for the four-wheel drive vehicle can be obtained.

According to the third aspect of the present invention, the cover member 152 for protecting the brake disc 137 is provided.

Since the cover member 152 for protecting the brake disc 137 is provided, the brake disc 137 can be protected from flying gravel, etc. by the cover member 152 and hence it is possible to improve the reliability of the saddle-ride type all terrain vehicle 10.

According to the third aspect of the present invention, the flange portion 152b is formed on an edge of the portion of the cover member 152 except a lower portion.

At the portion except a lower portion of the cover member 152, mud, flying gravel, etc. can be made more difficult to strike against the brake disc 137 by the presence of the flange portion 152b, while at the lower portion of the cover member 152, mud, flying gravel, etc. having entered between the brake disk 137 and the cover member 152 can be made easier to be discharged, whereby the reliability of the saddle-ride type all terrain vehicle 10 can be further improved.

According to the fifth aspect of the present invention, in a brake caliper support structure for the saddle-ride type all terrain vehicle 10 wherein the disc brake 110 including the brake disc 137 and the brake caliper 111 for braking the brake disc 137 in a sandwiching relation to the brake disc is disposed inside the wheel 154 and the hub 146 is mounted rotatably to the knuckle 88, the brake disc 137 being secured to the hub and the brake caliper 111 being secured to the knuckle 88, the brake caliper 111 includes the caliper bracket 131 mounted to the knuckle 88 and the caliper assembly 134 connected to the caliper bracket 131, and the caliper bracket 131 has the projections 131C and 131D for removing mud, snow, etc. adhered to the wheel 154, more particularly, adhered to the inner surface of the rim 154a, at positions adjacent to the first and second mounting portions 131A, 131B of the caliper bracket.

Mud, snow, etc. adhered to the inner surface of the wheel 154 can be scraped off by the projections 131C and 131D without the need of any special member for removing such mud and snow, whereby it is possible to reduce the number of parts and hence reduce the cost.

According to the sixth aspect of the present invention (see also FIG. 6(a)), the projections 131C and 131D are formed outside the most radially outwardly projecting portion (i.e., the outer surface 136e of the caliper body 136) of the caliper assembly 134.

Since the projections 131C and 131D are formed outside the most radially outwardly projecting portion of the brake caliper 111, mud, snow, etc. adhered to the brake disc 137 can be scraped off positively by the projections 131C and 131D. Therefore, it is possible to improve the running-through performance of the saddle-ride type vehicle 10 on an uneven road.

According to the seventh aspect of the present invention (see also FIG. 10(a)), an edge (i.e., the side face 131d) of the projections 131C and 131D extends substantially in the radial direction of the brake disc 137 and lies on an extension line of an edge (i.e., the side face 131f) of the caliper bracket 131 or projects from the side face 131f.

Since the side face 131d of each of the projections 131C and 131D lies on an extension line of the side face 131f of the caliper bracket 131, mud, snow, etc. can be scraped off by the side face 131d, there is no fear of accumulation mud, snow, etc. between the inner surface of the wheel 154 and the brake caliper 111.

According to an eighth aspect of the present invention, as described above in connection with FIG. 9, there are at least two mounting portions (i.e., the first and second mounting portions 131A, 131B) for mounting the caliper bracket 131 to the knuckle 88 and at least two projections 131C and 131D are formed so that their tips are equidistant (radius R2) from the center (point 190) of the wheel 154.

Since there are at least two mounting portions for mounting the caliper bracket 131 to the knuckle 88 and the tips of at least two projections are equidistant from the center of the wheel, the caliper bracket can be used in common to both right and left disc brakes of the vehicle and the reduction of cost can be attained by the reduction in the number of parts.

As described above in connection with FIGS. 2 and 11, according to an ninth aspect of the present invention, in a brake hose support structure for a saddle-ride type vehicle wherein the disc brake 110 including the brake disc 137 and the brake caliper 111 which brakes the brake disc 137 in a sandwiching relation to the brake disc is disposed inside the wheel 154 as a front wheel 17, with a braking fluid pressure being fed to the brake caliper 111 through the brake hose 112, the right and left front wheels 17, 17 are each supported independent-suspensionwise by the front upper arm 40 as an upper arm and the front lower arm 41 as a lower arm, and the knuckle 88 is connected through ball joints 86 and 87 to front ends of the front upper arm 40 and the front lower arm 41, the third bracket 225 as the hose support portion for supporting the brake hose 112 is provided on the king pin axis 115 passing through the centers of the ball joints 86 and 87.

Since the third bracket 225 is provided on the king pin axis 115, not only the brake hose 112 can be bent, centered on the third bracket 225, but also it can be allowed to deflect at only the short distance from the third bracket 225 to the brake caliper 111. Consequently, the amount and range of movement of the brake hose 112 can be made small and it is possible to prevent the brake hose 112 from undergoing an excessively large deflection. As a result, the space around the brake hose 112 can be made small and it is possible to attain the reduction in size of the saddle-ride type all terrain vehicle 10.

According to an tenth aspect of the present invention, the brake hose 112 is supported by the front upper arm 40.

Since the brake hose 112 is supported by the front upper arm 40, the front lower arm 41 serves as a guard member which covers the lower portion of the brake hose 112 and it is possible to protect the brake hose 112 from flying gravel and projections on a road surface.

According to an eleventh aspect of the present invention, the front upper arm 40 is constituted by the paired front arm 235 and rear arm 222 and the brake hose 112 is disposed along the rear arm 222.

Since the brake hose 112 is disposed along the rear arm 222, the front arm 235 in the front upper arm serves as a guard member which covers the front portion of the brake hose 112 and hence it is possible to protect the brake hose 112 from flying gravel, etc. Thus, a further improvement can be attained.

According to an twelfth aspect of the present invention, one end of the front cushion unit 42 as a cushion unit for cushioning a shock transmitted from each wheel 17 to the vehicle body side is attached to the vehicle body side, while an opposite end thereof is attached to the upper arm 40.

By attaching the lower end of the front cushion unit 42 to the front upper arm 40, the lower end of the front cushion unit 42 and the brake hose 112 are supported by the same front upper arm 40, so that the brake hose 112 and the front cushion unit 42 do not interfere with each other even if the suspension swings. Besides, by mounting the front cushion unit 42 at a highly rigid position where the front and rear arms 235, 222 which constitute the front upper arm 40, it is possible to bear the load of the front cushion unit 42 positively.

Although in the above embodiment the side face 131d of the projection 131C is formed as a flat face as shown in FIG. 10(a) and the side face 205a of the projection 205 is constituted by two side faces 205b and 205c, this constitutes no limitation. The side face of the projection 131C (or the projection 205) may be a concave-like arcuate face, a convex-like arcuate face, or a combination of both a plane and an arcuate face, insofar as the side face of the projection extends radially of the brake disc and lies on an extension line of the side face of the caliper bracket or projects from the side face of the caliper bracket.

The brake caliper support structure and brake caliper structure of the present invention are suitable for a saddle-ride type all terrain vehicle.

The brake hose structure of the present invention is suitable for a vehicle wherein each wheel is steered around a king pin axis.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake caliper support structure for a saddle-ride all terrain vehicle, comprising:
   a hub, said hub being rotatably mounted to a knuckle;
   a wheel and a brake disc secured to said hub; and
   a disc brake having a brake caliper for braking said brake disc in a sandwiching relation to the brake disc is disposed inside said wheel, the brake caliper comprising:
      a pair of pads for sandwiching said brake disc therebetween;
      a piston for pushing said pads;
      a caliper body which accommodates said piston movably; and a caliper bracket secured to a caliper support portion which is provided in said knuckle for supporting said caliper body movably, wherein the distance from the center of said wheel to said caliper support portion is set longer than the distance from the center of said wheel to the center of said piston, wherein a braking fluid pressure is fed to said brake caliper through a brake hose, right and left vehicular wheels are each supported independent-suspensionwise by an upper arm and a lower arm, and the knuckle is connected through ball joints to front ends of said upper arm and said lower arm, and wherein a hose support portion for supporting said brake hose is provided on a king pin axis extending through the centers of said ball joints.

2. The brake caliper structure for a saddle-ride all terrain vehicle according to claim 1, wherein said brake hose is supported by said upper arm.

3. The brake caliper structure for a saddle-ride all terrain vehicle according to claim 2, wherein said upper arm comprises a pair of a front arm and a rear arm, and said brake hose is disposed along said rear arm.

4. The brake caliper structure for a saddle-ride all terrain vehicle according to claim 3, wherein one end of a cushion unit for cushioning a shock transmitted from each of said vehicular wheels to a vehicle body side is secured to the vehicle body side and an opposite end thereof is secured to said upper arm.

5. A brake caliper support structure for a saddle-ride all terrain vehicle, comprising:

a disc brake comprising a brake disc and a brake caliper, said caliper for braking said brake disc in a sandwiching relation to the brake disc, said disc brake being disposed inside a wheel, and a hub is mounted rotatably to a knuckle, said brake disc being secured to said hub and said brake caliper being secured to said knuckle, wherein said brake caliper comprises a caliper bracket mounted to said knuckle and a caliper assembly connected to said caliper bracket, said caliper assembly has a piston located therein, said caliper bracket has a projection at a position adjacent to a portion where said caliper bracket is mounted to said knuckle, and said projection extends radially further than the most radial extent of said caliper assembly.

6. The brake caliper structure for a saddle-ride all terrain vehicle according to claim 5, wherein said projection is formed outside a portion projecting most radially outside of a body of said brake caliper.

7. The brake caliper structure for a saddle-ride all terrain vehicle according to claim 5, wherein an edge of said projection extends substantially radially of said brake disc and lies on an extension line of an edge of said caliper bracket or projects from the edge of the caliper bracket.

8. The brake caliper structure for a saddle-ride all terrain vehicle according to claim 6, wherein an edge of said projection extends substantially radially of said brake disc and lies on an extension line of an edge of said caliper bracket or projects from the edge of the caliper bracket.

9. The brake caliper structure for a saddle-ride all terrain vehicle according to claim 5, wherein said caliper bracket is mounted to said knuckle in at least two positions and at least two of said projections are formed so that their tips are equidistant from the center of said wheel.

10. The brake caliper structure for a saddle-ride all terrain vehicle according to claim 5, wherein a braking fluid pressure is fed to said brake caliper through a brake hose, right and left vehicular wheels are each supported independent-suspensionwise by an upper arm and a lower arm, and the knuckle is connected through ball joints to front ends of said upper arm and said lower arm, and wherein a hose support portion for supporting said brake hose is provided on a king pin axis extending through the centers of said ball joints.

11. The brake caliper structure for a saddle-ride all terrain vehicle according to claim 10, wherein said brake hose is supported by said upper arm.

12. The brake caliper structure for a saddle-ride all terrain vehicle according to claim 11, wherein said upper arm comprises a pair of a front arm and a rear arm, and said brake hose is disposed along said rear arm.

13. The brake caliper structure for a saddle-ride all terrain vehicle according to claim 12, wherein one end of a cushion unit for cushioning a shock transmitted from each of said vehicular wheels to a vehicle body side is secured to the vehicle body side and an opposite end thereof is secured to said upper arm.

* * * * *